US011845442B2

(12) United States Patent
Hanson et al.

(10) Patent No.: US 11,845,442 B2
(45) Date of Patent: Dec. 19, 2023

(54) SYSTEMS AND METHODS FOR DRIVER PRESENCE AND POSITION DETECTION

(71) Applicant: Ford Global Technologies, LLC, Dearborn, MI (US)

(72) Inventors: Ryan Edwin Hanson, Livonia, MI (US); Pietro Buttolo, Dearborn Heights, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

(21) Appl. No.: 17/216,138

(22) Filed: Mar. 29, 2021

(65) Prior Publication Data

US 2022/0306123 A1     Sep. 29, 2022

(51) Int. Cl.
| | | |
|---|---|---|
| *B60W 40/08* | (2012.01) | |
| *B60W 50/00* | (2006.01) | |
| *B60W 30/14* | (2006.01) | |
| *B60W 10/18* | (2012.01) | |
| *G06V 20/59* | (2022.01) | |

(52) U.S. Cl.
CPC ............ *B60W 40/08* (2013.01); *B60W 10/18* (2013.01); *B60W 30/146* (2013.01); *B60W 50/0098* (2013.01); *G06V 20/593* (2022.01); *B60W 2040/0881* (2013.01); *B60W 2050/0075* (2013.01); *B60W 2300/185* (2013.01); *B60W 2540/223* (2020.02); *B60W 2556/10* (2020.02)

(58) Field of Classification Search
CPC ......... B60W 10/18; B60W 2040/0081; B60W 2300/185; B60W 2540/223; B60W 2556/10; B60W 30/146; B60W 40/08; B60W 50/0098; G06V 20/593
See application file for complete search history.

(56) References Cited

U.S. PATENT DOCUMENTS

| | | |
|---|---|---|
| 7,164,117 B2 | 1/2007 | Breed et al. |
| 7,663,502 B2 | 2/2010 | Breed |
| 7,887,089 B2 | 2/2011 | Breed et al. |
| 8,054,203 B2 | 11/2011 | Breed et al. |

(Continued)

FOREIGN PATENT DOCUMENTS

WO         0050261 A3     8/2001

OTHER PUBLICATIONS

Braun et al., "Capseat—Capacitive Proximity Sensing for Automotive Activity Recognition", RheinMain University of Applied Sciences, Wiesbaden, Germany, Automotive UI '15, ISBN 978-1-4503-3736-6/15/06, Sep. 1-3, 2015, 8 pages.

(Continued)

*Primary Examiner* — Jeff A Burke
*Assistant Examiner* — Zachary Joseph Wallace
(74) *Attorney, Agent, or Firm* — Frank Lollo; Eversheds Sutherland (US) LLP

(57) ABSTRACT

Systems and methods for driver presence and position detection are disclosed herein. A method can include determining a presence and a position of a driver in a sensing zone of a vehicle using a sensor platform integrated into the vehicle, determining when the position of the driver indicates that the driver is not in a fully-seated position relative to a driver's seat of the vehicle, and selectively adjusting a vehicle parameter of the vehicle based on the driver not being in a fully-seated position.

16 Claims, 4 Drawing Sheets

(56) References Cited

U.S. PATENT DOCUMENTS

| | | | | |
|---|---|---|---|---|
| 8,874,301 B1* | 10/2014 | Rao | ............... | G05D 1/0061 |
| | | | | 340/576 |
| 2013/0009761 A1* | 1/2013 | Horseman | ............ | A61B 5/6893 |
| | | | | 340/576 |
| 2016/0001781 A1* | 1/2016 | Fung | ............... | G16H 50/20 |
| | | | | 701/36 |
| 2019/0168771 A1* | 6/2019 | Migneco | ............... | B60W 40/08 |
| 2020/0062275 A1* | 2/2020 | Higgins | ............... | G05D 1/0061 |
| 2021/0331647 A1* | 10/2021 | Kim | ............... | G06V 40/172 |
| 2022/0174867 A1* | 6/2022 | McCutcheon, IV | ............... | |
| | | | | H04N 17/002 |

OTHER PUBLICATIONS

George et al., "A Novel Seat Occupancy Detection System Based on Capacitive Sensing", IEEE Xplore, Jun. 2008 (Abstract only).

\* cited by examiner

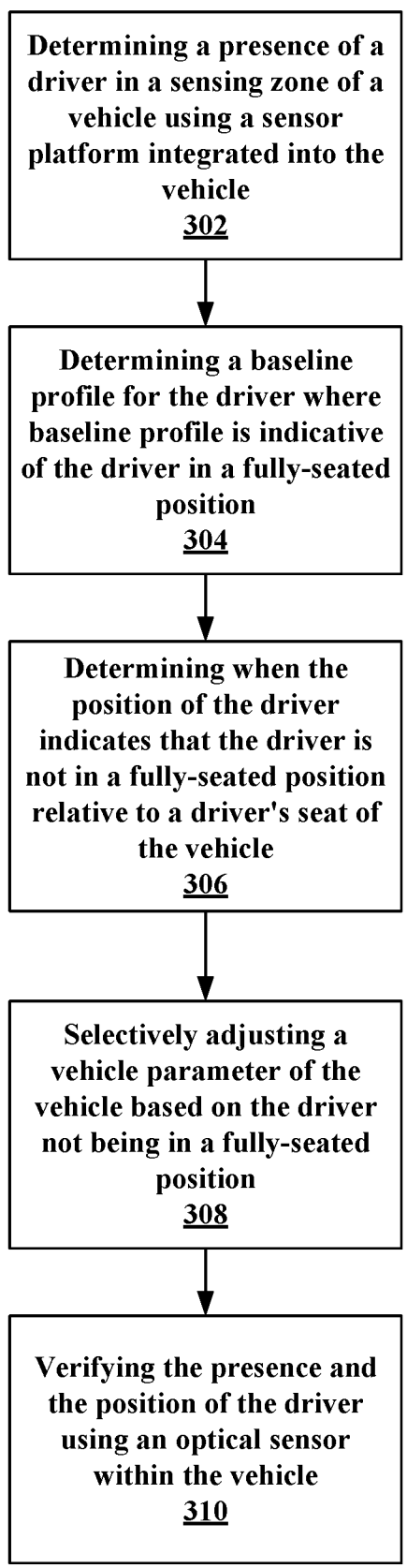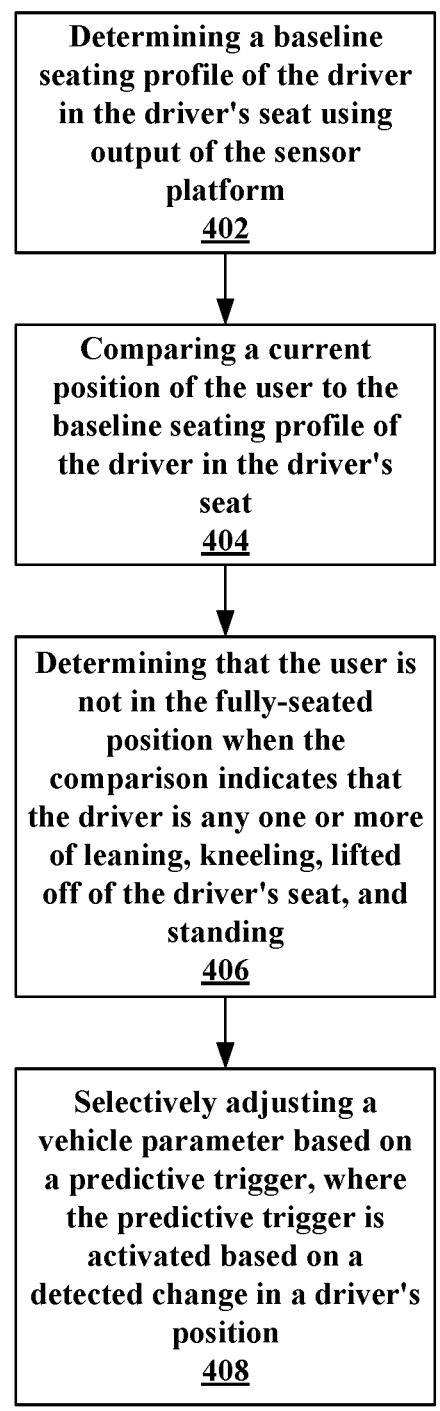
FIG. 3
FIG. 4

SYSTEMS AND METHODS FOR DRIVER PRESENCE AND POSITION DETECTION

BACKGROUND

There exist special use cases in off-road driving where terrain and or maneuvers require a driver to be in a position other than fully-seated to maintain the safety of both the vehicle and driver. Thus, in some instances, a driver may operate a vehicle in a non-seated position. For example, the driver of an off-road capable vehicle may drive the vehicle while in a non-fully-seated position such as standing, kneeling, or leaning. The driver may find this position to be advantageous in order to obtain a better view of certain parts of the vehicle during off-roading. For example, when the vehicle is being driven over boulders the driver may wish to determine if there is sufficient clearance between the vehicle and a boulder or another adjacent object.

Sometimes vehicle doors and/or roof sections may be removed, and this may result in the driver not being detected as present, causing the termination and/or engagement of vehicle features that could hinder the driver's ability to operate the vehicle. These vehicle features include but are not limited to the following; the engagement of auto-park (shift to Park on driver exit), secure idle where gear shifting is rendered unavailable until a valid key is returned to the vehicle interior, hill assist where the vehicle brake is engaged to prevent backsliding during hill climbing events, traffic jam assist where the vehicle applies braking force and allows the vehicle to move up a given distance from the vehicle ahead of them, and trail control (a low speed cruise control for trail and rock climbing driving)—just to name a few.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 3 is a flowchart of an example method of the present disclosure for driver presence and position detection.

FIG. 4 is a flowchart of another example method for determining when the position of the driver indicates that the driver is not in the fully-seated position.

DETAILED DESCRIPTION

Overview

Figure 1:
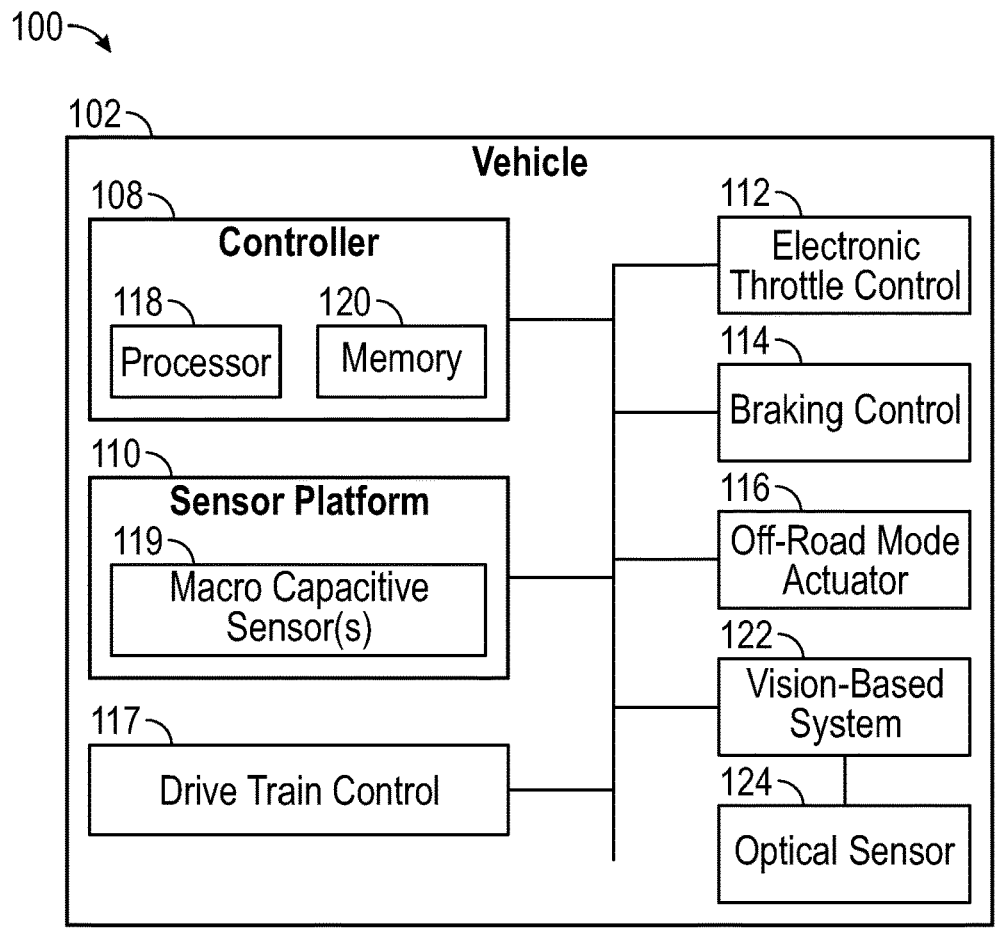
FIG. 1 illustrates an example architecture where the systems and method of the present disclosure may be practiced.
Figure 1:
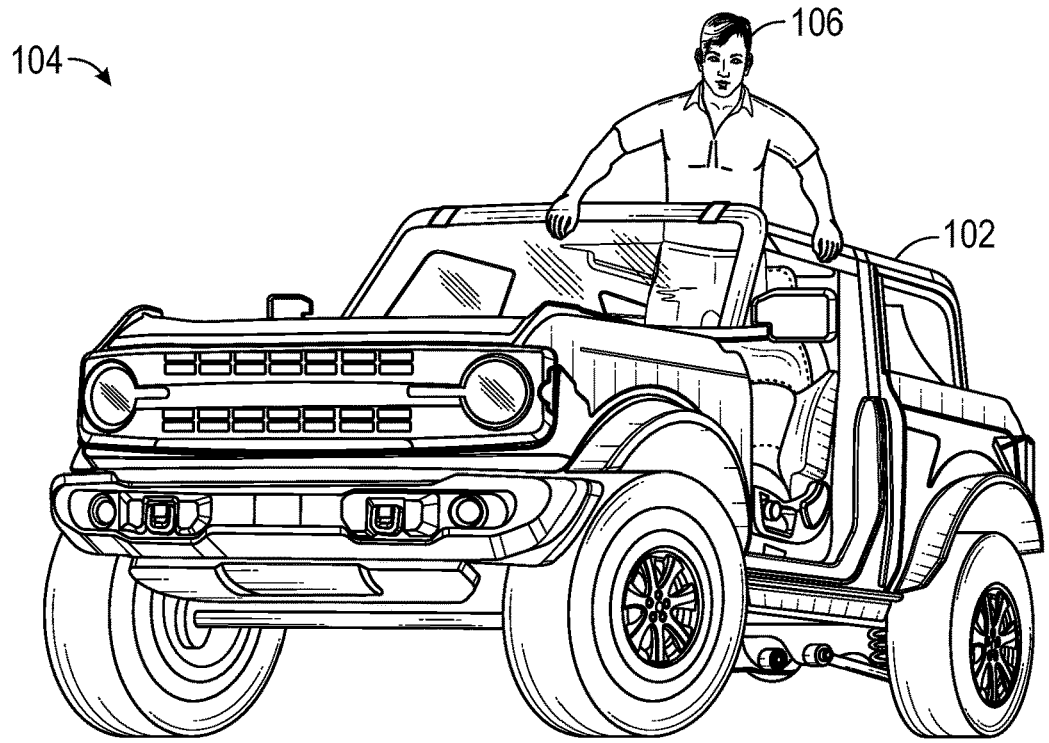

The present disclosure generally pertains to driver presence and position sensing, as well as selectively adapting vehicle parameters, functions, and/or operations based on a sensed driver position. In more detail, the present disclosure involves systems and methods that detect an operator or driver of a vehicle being present, as well as their position, even if not seated, through the use of sensor(s). These sensor(s) can include one or more macro-capacitive sensors.

The systems and methods can enable specialized vehicle control during unique conditions related to special use cases (user experiences "UX") in off-road driving, for example. These special use cases may include instances where an ideal driver position may not be a fully-seated position, such as during tight maneuvering conditions or other similar off-road paradigms. These non-fully seated positions may allow a driver to visualize their surrounding environment in ways that would be difficult or impossible if the driver were in a fully-seated position. Other alternative driver positions may include the driver leaning out a window or door frame of the vehicle, lifting up off the seat, kneeling on the seat or even standing up in the vehicle.

While traditional methods of driver presence detection exist, these methods fail to definitively determine the driver's position in the vehicle. These traditional detection systems may include using an occupant classification sensor which is a direct method of detection that involves measuring the output of a weight based sensor placed in the bottom of a seat. For example, the sensor measures air pressure from a bladder placed in the seat bottom. A seat belt sensor is an example indirect method that involves sensing a closed contact of a seat belt connector. Another example includes a door ajar sensor, which is another indirect sensing method that detects door closure combined with the vehicle ignition status to infer the driver position as inside/outside.

Other example technologies that can be used to detect driver presence include, but are not limited to driver attention monitoring which is a direct method that uses a camera to focus on a driver's location (such as driver's seat) and evaluate that location to determine if the driver is focused on the road. A thermal sensor can be used to sense driver body temperature at a specific location of focus. An ultrasonic sensor can be used to sense objects or reduction of area in a zone of a seat.

In accordance with the present disclosure, the systems and methods disclosed herein can include a sensor platform and controller that detect both the presence of the driver (e.g., to check if there a driver in the vehicle or not), as well as a position of the driver relative to a sensing zone of the vehicle. For example, the sensing zone can include a driver's seat area that includes primary controls for the vehicle, such as a steering wheel. The position is indicative of a body posture of the driver relative to the driver's seat in some instances.

Sensors for detecting presence and position can be integrated into any part of the vehicle that is adjacent to or within the sensing zone of the vehicle. For example, one or more sensors can be integrated into the driver's seat or a vehicle frame element such as a vehicle door, an A-pillar, a B-pillar, a dash panel, a screen pillar that surrounds the windshield, and so forth.

Vehicle parameters, functions, and/or operations can be selectively altered based on sensed changes in driver position. For example, when the driver is determined to be fully seated, normal vehicle functions can be enabled. When the driver is determined not to be in a fully-seated position, some aspects of vehicle control may be selectively altered. For example, alterations to vehicle throttle input, and/or braking may be modified. In one example, damping of both acceleration and braking may be realized to prevent the driver from unintentionally accelerating or slowing the vehicle when the driver is not in a fully-seated position.

These vehicle operations can also be adjusted when a user selects an off-road actuator such as a switch or button within the vehicle.

The systems and methods herein provide for recognition and protection of an allowable mode of driving of a vehicle by a driver in a non-seated state (e.g., not full-seated). Methods disclosed herein provide for direct driver presence and position detection through the use of macro-capacitive sensor(s). Accurate driver presence detection can be achieved, as well as an accurate position of the driver in a vehicle controls location (referred to as a sensing zone). Driver position sensing can be fine-tuned to detect when the driver is sitting, hunched, leaning, and/or standing in the vehicle. The systems and methods herein also provide enhanced vehicle operation using presence and position detection to limit a search zone for a driver's face on vision-based features.

Illustrative Embodiments

Turning now to the drawings, FIG. 1 depicts an illustrative architecture 100 in which techniques and structures of the present disclosure may be implemented. The architecture 100 can comprise a vehicle 102 in an operating area 104. For example, the vehicle 102 may be operating on off-road terrain. A driver 106 may be motivated to operate the vehicle 102 in both a fully-seated position, as well as any position that is not fully-seated, as illustrated in FIG. 1.

The vehicle 102 generally comprises a controller 108, a sensor platform 110, an electronic throttle control 112, a braking control 114, and an optional off-road mode actuator 116, and a drive-train control 117. The controller 108 can comprise a processor 118 and memory 120 for storing executable instructions, the processor 118 can execute instructions stored in memory 120 for performing any of the driver presence and position detection and response features disclosed herein. Also, the controller 108 can direct signals or messages to each of the electronic throttle control 112, the braking control 114, and/or the drive-train control 117 based on the output of the sensor platform 110. When referring to operations performed by the controller 108, it will be understood that this includes execution of instructions stored in memory 120 by the processor 118.

The sensor platform 110 can include one or more macro-capacitive sensors (MCS) 119 that detect changes in capacitive fields within the sensing zone of the vehicle 102 to determine the presence and the position of a driver in the sensing zone. Individual sensors output signals that are indicative of a rise and fall of capacitive field interference as the driver transitions through its field. An example sensing zone is illustrated and described in FIG. 2. While the use of macro-capacitive sensors 119 has been disclosed, other types of sensors that are capable of detecting the presence and position of a driver of the vehicle can be used such as ultrasonic, LIDAR, and so forth.

Figure 2:
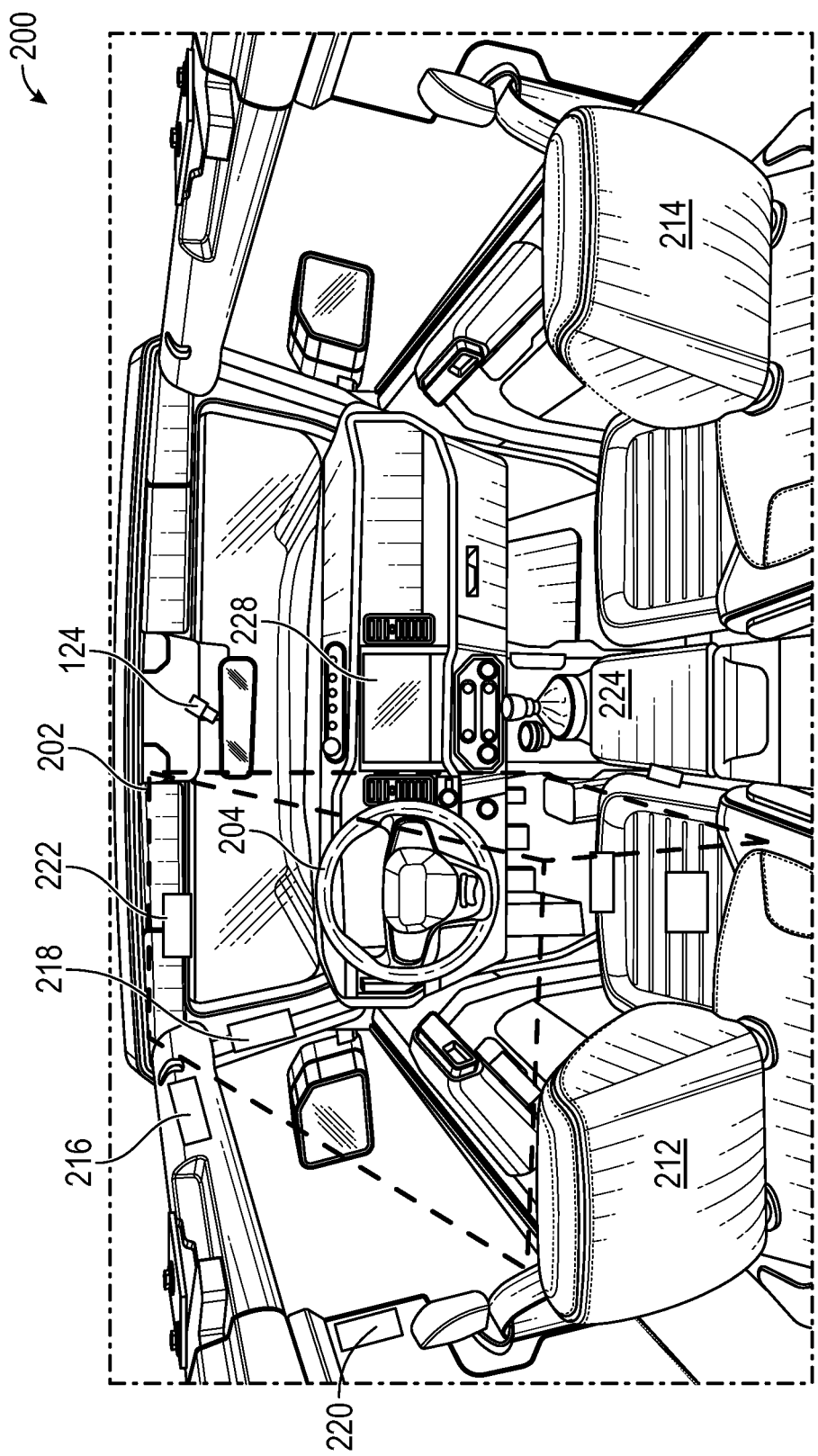
FIG. 2 is a perspective view of an example vehicle interior.

Generally, FIG. 2 illustrates an example interior 200 of the vehicle 102. FIGS. 1 and 2 will be referenced collectively in the following paragraphs. A sensing zone 202 can be configured as desired, but generally includes the area where the driver sits in front of a steering wheel 204. The steering wheel 204 is part of a primary driving interface that can also include objects on the steering column, as well as a gas pedal and brake pedal. The sensing zone 202 can include any area in the front of the vehicle 102 where the driver may be located during operation. In some instances, this can include the entire front area of the vehicle in front of both the driver's side seat 212 and the passenger's seat 214.

Portions of the sensor platform 110 may be integrated into various vehicle components. For example, a macro-capacitive sensor (MCS) can be integrated into a door panel location 216, an A-pillar location 218, a B-pillar location 220, a windshield header location 222, a center console location 224 and the like. The MCS can be integrated in the driver's side seat 212 (the seat pan/bottom, seat nose, and the seatback and/or headrest. The exact location of the MCS can vary according to design requirements.

A plurality of MCSs can be integrated into various vehicle components. In some instances, a MCS may be positioned in various locations including, but not limited, to a seat bottom—driver's bottom, seatback—driver's back, seat nose—driver's legs, pedals—driver's feet/legs, a floor in front of a seat—driver's feet, dash lower close out panel—driver's feet/legs, center console side panel—driver's legs/hips/lower torso, door panel (if present)—driver's legs/hips/lower torso, steering wheel—driver's hands, A-Pillar—driver's hands, windshield header—driver's s hands. In general, MCSs can be integrated into the vehicle interior or worn by the driver. In situations where the MCSs are worn by the driver, the MCSs can each be configured to communicate with the controller 108 over a short-range wireless connection, such as BLUETOOTH, Ultra-Wide Band (UWB), WiFi or near field communications (NFC), RFID, as examples.

In some instances, the controller 108 can initiate a presence and position mode of operation when a driver gains access to the vehicle 102. When the driver is in a fully-seated position, the controller 108 can obtain sensor output from the sensor platform 110 and compute a baseline profile for the driver. In instances where the sensor platform includes MCS, the controller 108 can compute capacitive field values for a baseline profile. This baseline profile can also include detection and characterization of other objects in the sensing zone 202 as well such as vehicle objects.

After the creation of the baseline profile, the controller 108 can determine the presence and position of the driver in real-time or near-real-time as the driver moves into and out of one or more sensor fields in the sensing zone 202. This allows the controller 108 to detect when the driver is in a not fully-seated position relative to the driver's side seat 212. When the driver has been determined to be in a not fully-seated position, the controller 108 can activate a non-seated drive mode. Alternatively, the non-seated drive mode can be activated when the driver utilizes the optional off-road mode actuator 116. For example, when the driver is operating the vehicle 102 in an off-road capacity, the driver can engage the non-seated drive mode by manipulation of the optional off-road mode actuator 116. The optional off-road mode actuator 116 can include a physical switch or button. Alternatively, the optional off-road mode actuator 116 can include a virtual switch or button provided on a human-machine interface 228 of the vehicle 102.

The controller 108 can activate a presence and position sensing mode based on indicators or vehicle driving modes, such as activation of trail mode. For example, when a driver has activated a trail mode of the vehicle, the controller 108 can automatically activate a mode of vehicle operation where driver position may be sensed and corresponding adjustments in vehicle systems are effectuated. At the point of vehicle access by the driver, the controller 108 can activate the sensor platform 110 to sense for characteristic changes to the sensor fields.

Once the vehicle 102 is operational or running, the controller 108 may continue to examine the output of the sensor platform 110 for changes in signals (such as capacitive fields) indicating the driver has exited or otherwise shifted positions within the sensing zone 202. In instances where the sensor platform 110 includes a plurality of sensing elements, the controller 108 may determine when a foot and or leg of the driver has entered the sensing zone 202, accompanied by sensing a hand on the steering wheel 204, A-pillar 218 or both, and later followed by the lower torso, rear, back and another leg. To be sure, this is only an example scenario and is not intended to be limiting.

In some instances, the user may exit the vehicle while in a trail control mode. For example, the user may exit the vehicle to examine terrain around the vehicle. If the controller 108 determines, based on sensor output, that a user has left a sensed areal sensing zone 202 of the vehicle, or has entirely left the vehicle. The controller 108 may enact a response that includes automatically engaging or activating functionalities such as a secure idle, search for key present, regulator features, and the like. The controller 108 can disable any feature that may have been available to the user during a trail mode. This ensures that, should the operator leave the vehicle, by choice or otherwise, the vehicle does not continue to move with the user not present. Using the example above, the user may step out of the vehicle to inspect the next boulder and forgets to put the vehicle in a safe mode (i.e., parking with or without a parking brake engaged). The controller 108 can cause the vehicle to remain stationary until the user returns by engaging the parking brake and/or placing the vehicle into park. Once the user returns, any features related to a trail control mode could be reengaged by the user. Alternatively, the controller 108 can determine that the user has reentered the vehicle and automatically reengage the trail control mode. In some instances, the trail control mode can be reengaged when the user confirms that they have reentered the vehicle and wish to continue the trail control mode of vehicle operation. The user could confirm their reentry and reengagement through a human-machine interface of the vehicle.

The controller 108 can determine when the driver shifts in their seat during the trip. In vehicles with trail control (a low-speed cruise control for off-road driving and rock crawling), a driver may inadvisably hunch or stand in the vehicle to see over a hood of the vehicle for avoidance or tight maneuvers through debris or obstructions. In one example use case, the controller 108 may determine driver movement or position shifting based on sensor platform 110 output. For example, the controller 108 may sense a change of driver position away from the pedals, seat bottom and lower seatback, and steering wheel and towards the pedal and floor, along with the seat nose (edge of seat bottom), upper steering wheel, and/or A-pillar or windshield header.

The controller 108 may be configured to perform finer detections of driver movements and positions within the driver seating area through the placement of MCS arrays within the areas of interest. An MCS array can include any number of MCS elements arranged together or separately. In some instances, a single array can be used that includes a plurality of MCS elements. The directionality of each of the MCS elements can vary. For example, a portion of the MCS elements can be directed to above the seat bottom, a portion of the MCS elements can be directed to the seatback, a portion of the MCS elements can be directed to the seat headrest, and above. A portion of the MCS elements can be directed across and in front of the driver's seat 212.

When the sensor platform 110 includes arrays of macro capacitive sensors, such as multiple sensors across the driver's seat 212 such as the seat bottom, seat nose, seatback, side of the center console or around the steering wheel. In one example, MCSs elements can be spaced apart at a distance around the steering wheel 204, such as every 15 degrees. The controller 108 can utilize the output of these various MCSs elements of the sensor platform 110 to track driver movement and positional changes within the sensing zone 202 (such as the area around the driver's seat 212). The specificity and sensitivity of the sensor platform 110 are proportional to the size and number of sensor elements present.

It will be understood that once the controller 108 has obtained a baseline profile for the driver that is indicative of the driver being in a fully-seated position, the controller 108 can obtain in real-time or near-real-time, the output from the sensor platform 110 to determine capacitive field values. These real-time capacitive field values can be compared to the capacitive field values of the baseline profile. When discrepancies or changes are detected, the controller 108 can determine that the driver is not in a fully-seated position any longer. As noted above, depending on the number and placement of the MCSs of the sensor platform 110, the position of the driver can be determined with varying degrees of specificity. In a general case, the sensor platform 110 can determine only that the driver is in a not-full-seated position. As the granularity and specificity of the capacitive field data increases, more specific determinations of driver position changes can be determined such as whether the driver is standing, crouching, kneeling, leaning, and the like.

In some instances, the controller 108 can be trained to identify not only that the driver's position has changed, but a likely posture of the driver (e.g., leaning, standing, crouching, kneeling). The controller 108 can implement machine learning (ML) or artificial intelligence (AI) that can be trained on capacitive field data that are indicative of various driver position(s). Likewise, the controller 108 can implement ML or AI that is trained to identify when the driver is in a fully-seated position as well.

When these changes in position are determined, corresponding changes to vehicle attributes or parameters may result. This may include the controller 108 selectively adjusting a vehicle function or vehicle system performance. For example, when the controller 108 determines that the driver is in a not-fully-seated position, the controller 108 can activate an off-road mode of operation for the vehicle where one or more vehicle operations or functions are selectively altered. For example, the controller 108 can cause damping of throttle response by transmitting signals to the electronic throttle control 112. Thus, when the driver pushes on the gas pedal, the throttle response by the electronic throttle control 112 can be limited. This can include limiting the acceleration profile and/or the speed profile of the vehicle 102. By way of example, regardless of how far the gas pedal is depressed (or how quickly it is depressed), the response by the electronic throttle control 112 can be limited. The response by the electronic throttle control 112 can be adjusted to ten percent (only an example and could be another value) compared with how the electronic throttle control 112 would respond if in a non-limited mode. The speed of the vehicle 102 can also be capped at, for example, three miles per hour.

Likewise, the controller 108 can cause damping of braking response by transmitting signals to the braking control 114. This may prevent the vehicle 102 from stopping abruptly when the brake pedal is used by the driver. Other vehicle functions can be modified such as a limit on vehicle speed when the vehicle is in declination/descent. For example, if the vehicle is descending a steep hill, the speed of the vehicle could be limited to a set value such as two miles per hour. Limitations on braking and throttle can prevent sudden acceleration or jerks that would otherwise be experienced by the driver.

In some instances, the controller 108 can adjust the drive-train control 117 to allow the driver to set engine torque to allow the vehicle 102 to overcome a boulder or small hill, but autobrake (controlled by the braking control 114) can be used to control speed during and after overcoming of the obstacle to keep the vehicle 102 moving smoothly and fluidly to prevent jarring movements.

In some instances, such as when the roof and/or doors are removed from the vehicle 102, the controller 108 can detect rain or other situations where moisture may be present with respect to the MCSs. For example, the controller 108 could receive signals from a rain sensor or module associated with an automatic windshield wiper system of the vehicle 102 to detect the presence of rain. Rain or other moisture (such as water splashing into the vehicle during off-roading) may interfere with operations of MCSs (e.g., preventing or deleteriously affecting detection of capacitive fields). Therefore, when rain is detected, the controller 108 can deactivate use and/or control of the vehicle using MCSs. The user could be prompted by visual or audio output to return to a fully-seated position in order to drive the vehicle.

As noted above, the controller 108 can enable predictive triggers based on sensor output. For example, the controller 108 can activate a vehicle sub-system to turn on a turn signal given that a driver's position indicates that the driver is sliding along a steering wheel. As noted above, another automated response can include the controller 108 activating a portion of the MCSs of the sensor platform 110, such as MCSs associated with a window header or A-pillar because the vehicle 102 is in trail mode and the controller 108 determines that the driver is moving forward or up in their seat. In sum, the controller 108 can selectively adjust or select which of a plurality of macro-capacitive sensors of the sensor platform 110 are being used based on the position of the driver. For example, when the driver is determined to be standing, the sensor platform 110 can select MCSs associated with the steering wheel, windshield header, and/or the A-pillar to detect changes in driver position that can be used to automate vehicle functions or operations.

The controller 108 can also automatically perform a key search when the vehicle 102 is in a secure idle mode and MCSs of the sensor platform 110 that are associated with the seat bottom have detected someone entering the vehicle even though the vehicle doors may have been removed. Yet another example includes instances where the controller 108 detects the driver moving up and out of a fully-seated position. The controller 108 can automatically turn off key searches for key modality, such as facial authentication that require the driver's face to be at a certain location. Additionally, this could also be done for Phone as a Key (PaaK) or Fob Based Passive Entry Passive Start (PEPS) devices, because the localization algorithm may detect the device (i.e., mobile phone or fob) as out of the vehicle if the driver has the mobile device or fob in a location such as a jacket or a shirt pocket or outside pocket during instances where the driver is standing or leaning out of the vehicle.

Additionally, given the presence and position detection features provided by the controller 108 (in some instances using macro capacitive sensors) it is possible to detect the driver's back alignment with respect to a seat back, angle to the seat back, and relative position of the driver's shoulders. Based on these parameters the controller 108 can be used to improve or enhance other features in the vehicle through the knowledge of these physical aspects of the driver. Thus, by knowing the location of the driver's shoulders and inferred position of their head, the controller 108 can provide coordinates to a vision-based system 122 indicating the location in an image frame where the vision-based system 122 should look to find the driver's face. The vision-based system 122 can then determine (based on an image obtained from an optical sensor 124 such as a camera) if the driver's face is in or out of frame, allowing them to limit illumination, capture, and analysis of images. For example, the vision-based system 122 can determine if the driver was not visible in low power operation mode, such as a key-off application like vehicle start. In addition, this driver location/position information allows the vision-based system 122 to improve efficiency by limiting the zone of the image to analysis to find the driver's face.

In some instances, the optical sensor 124 can be placed into the vehicle such as a camera. Images from optical sensor 124 can be processed by the controller 108 to identify a driver's face and its position relative to a headrest of the driver's side seat 212. The output of the optical sensor 124 can be used to independently infer or determine a position of the driver. The output of the optical sensor 124 can be used to verify or confirm a position determination made by the controller 108 based on the output of the macro-capacitive sensor(s) of the sensor platform 110. The optical sensor 124 can also be used for driver state monitor, personalization and or wellness monitoring. Also, the output of the sensor platform 110 can be used to direct the optical sensor 124 to a location in the vehicle where the driver has been sensed. For example, if the driver is determined to be leaning across the center console, the optical sensor 124 can be instructed to locate the driver's face near the passenger's seat 214 rather than the driver's seat 212 as would be expected if the driver were in a fully-seated position.

FIG. 3 is a flowchart of an example method of the present disclosure. The method can include a step 302 of determining a presence of a driver in a sensing zone of a vehicle using a sensor platform integrated into the vehicle. For example, the driver can be sensed entering the vehicle and sitting in a driver's seat based on changes in capacitive fields of MCSs located in the vehicle.

In some instances, the presence of a driver can be determined after activating a presence and position feature of the vehicle. The activation of the presence and position feature can be based on sensing when the driver enters the vehicle using MCSs sensors. The activation of the presence and position feature can be based on determining when the vehicle is in an off-road mode (through driver activation). The activation of the presence and position feature can be based on determining when a roof of the vehicle has been removed. The activation of the presence and position feature can also be based on determining when an actuator for a non-seated drive mode has been activated.

Once the presence of the driver has been established, the method can include a step 304 of determining a baseline profile for the driver where the baseline profile is indicative of the driver in a fully-seated position. In some instances, the baseline profile is generated in advance and stored for later use. For example, a training mode can be used to establish a baseline profile for the driver when the driver purchases the vehicle. In other instances, a baseline profile can be generated each time the driver enters the vehicle.

Next, the method can include a step 306 of determining when the position of the driver indicates that the driver is not in a fully-seated position relative to a driver's seat of the vehicle. In some instances, this can include detecting changes in capacitive fields relative to the baseline profile.

The method can include a step 308 of selectively adjusting a vehicle parameter of the vehicle based on the driver not being in a fully-seated position. For example, a throttle and/or braking response may be damped in response to determining that the driver is not in a fully-seated position and is operating the vehicle. Non-limiting example responses can include damping a braking response of the vehicle, damping a throttle response of the vehicle, and/or slowing the vehicle when the vehicle is in descent.

The method can also include a step 310 of verifying the presence and the position of the driver using an optical sensor within the vehicle. For example, if the driver is determined to be in a not-fully seated position based on output of MCSs, the optical sensor can be activated to verify an actual, current position of the driver. Also, the output of the MCSs can be used to direct operations of a vision-based system as disclosed above.

FIG. 4 is a flowchart of an example method for determining when the position of the driver indicates that the driver is not in the fully-seated position. The method can include a step 402 of determining a baseline seating profile of the driver in the driver's seat using output of the sensor platform. This can include instructing a driver to assume a fully seated position through a human machine interface of the vehicle. The driver is then scanned using MCSs to create the baseline profile. The baseline profile is created from capacitive field output of the MCSs.

Next, the method includes a step 404 of comparing a current position of the user to the baseline seating profile of the driver in the driver's seat. The method can also include a step 406 of determining that the user is not in the fully-seated position when the comparison indicates that the driver is in any of one or more of leaning, kneeling, lifted up off of the driver's seat, and standing. Again, these are examples of changes in position and are not intended to be limiting.

The method can include a step 408 of selectively adjusting a vehicle parameter based on a predictive trigger, where the predictive trigger is activated based on a detected change in a driver's position. For example, a predictive trigger can include activating a turn signal when a change in driver position indicates that the driver is sliding to the left or right while they are in a not-fully-seated position.

Figure 5:
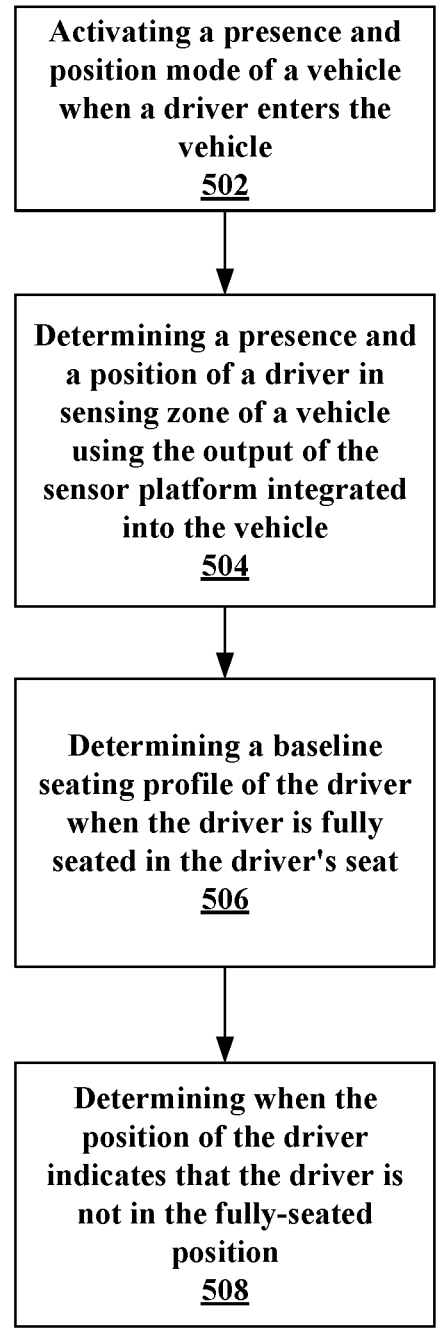
FIG. 5 is a flowchart of another example method of the present disclosure for driver presence and position detection.

FIG. 5 is a flowchart of another example method. The method can include a step 502 of activating a presence and position mode of a vehicle when a driver enters the vehicle. The method can also include a step 504 of determining a presence and a position of a driver in a sensing zone of a vehicle using the output of the sensor platform integrated into the vehicle. It will be understood that the sensor platform comprises a macro-capacitive sensor integrated into a driver's seat or a vehicle structural component of the vehicle.

Next, the method can include a step 506 of determining a baseline seating profile of the driver when the driver is fully seated in the driver's seat, as well as a step 508 of determining when the position of the driver indicates that the driver is not in the fully-seated position.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general purpose computer, special purpose computer, or special purpose processing device to perform a certain function or group of functions. An implementation of the devices, systems, and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
    determining a presence and a position of a driver in a sensing zone of a vehicle using a sensor platform integrated into the vehicle, wherein the presence and the position of the driver are associated with off-road or non-seated operation of the vehicle;
    determining, responsive to determining the presence and the position of the driver using the sensor platform, when the position of the driver indicates that the driver is operating the vehicle from an operating position other than not in a fully-seated position relative to a driver's seat of the vehicle; and
    selectively adjusting a vehicle parameter of the vehicle based on the driver operating the vehicle from the operating position other than the fully-seated position, wherein selectively adjusting the vehicle parameter comprises any one or more of:
        damping a braking response of the vehicle;
        damping a throttle response of the vehicle; and
        slowing the vehicle when the vehicle is in descent.

2. The method according to claim 1, wherein the sensor platform comprises a macro-capacitive sensor integrated into any one or more of the driver's seat or a vehicle structural component, the macro-capacitive sensor being configured to detect changes in capacitive fields to determine the presence and the position of the driver in the sensing zone, and combinations thereof.

3. The method according to claim 2, wherein one or more additional macro-capacitive sensors are associated with the driver.

4. The method according to claim 1, further comprising selectively adjusting which of a plurality of macro-capacitive sensors of the sensor platform are being used based on the position of the driver.

5. The method according to claim 1, further comprising verifying the presence and the position of the driver using an optical sensor within the vehicle.

6. The method according to claim 1, wherein determining the presence and the position of the driver occurs after activating a presence and position feature of the vehicle, the presence and position feature being activated based on any one or more of:
    sensing when the driver enters the vehicle;
    determining when the vehicle is in an off-road mode;
    determining when a roof or a door of the vehicle has been removed; and
    determining when an actuator for a non-seated drive mode has been activated.

7. The method according to claim 1, wherein determining when the position of the driver indicates that the driver is not in the fully-seated position comprises:
    determining a baseline seating profile of the driver in the driver's seat using output of the sensor platform;
    comparing a current position of the driver to the baseline seating profile of the driver in the driver's seat; and
    determining that the driver is not in the fully-seated position when the comparison indicates that the driver is any one or more of leaning, kneeling, lifted up off of the driver's seat, and standing.

8. The method according to claim 1, wherein the vehicle parameter can be further selectively adjusted based on determining a predictive trigger.

9. A method, comprising:
    activating a presence and position mode of a vehicle when a driver enters the vehicle;
    determining a presence and a position of the driver in a sensing zone of the vehicle using output of a sensor platform integrated into the vehicle, the sensor platform comprising a macro-capacitive sensor integrated into a driver's seat or a vehicle structural component of the vehicle, wherein the presence and the position of the driver are associated with off-road or non-seated operation of the vehicle;
    determining, responsive to determining the presence and the position of the driver using the output of the sensor platform, a baseline seating profile of the driver when the driver is in a fully-seated position in the driver's seat;
    determining, responsive to determining the presence and the position of the driver using the output of the sensor platform, when the position of the driver indicates that the driver is operating the vehicle from an operating position other than not in the fully-seated position; and
    selectively adjusting a vehicle parameter of the vehicle based on the driver operating the vehicle from the operating position other than the fully-seated position, wherein selectively adjusting the vehicle parameter comprises any one or more of:
        damping a braking response of the vehicle;
        damping a throttle response of the vehicle; and
        slowing the vehicle when the vehicle is in descent.

10. The method according to claim 9, further comprising selectively adjusting which of a plurality of macro-capacitive sensors of the sensor platform are being used based on the position of the driver, the macro-capacitive sensor being one of the plurality of macro-capacitive sensors.

11. The method according to claim 10, further comprising verifying the presence and the position of the driver using an optical sensor within the vehicle.

12. The method according to claim 9, wherein determining the presence and the position of the driver occurs after activating the presence and position feature of the vehicle, the presence and position feature being activated based on any one or more of:
    sensing when the driver enters the vehicle;
    determining when the vehicle is in an off-road mode;
    determining when a roof or a door of the vehicle has been removed; and
    determining when an actuator for a non-seated drive mode has been activated.

13. The method according to claim 12, wherein determining when the position of the driver indicates that the driver is not in the fully-seated position comprises:
    determining the baseline seating profile of the driver in the driver's seat using the output of the sensor platform;
    comparing a current position of the driver to the baseline seating profile of the driver in the driver's seat; and
    determining that the driver is not in the fully-seated position when the comparison indicates that the driver is any one or more of leaning, kneeling, lifted up off of the driver's seat, and standing.

14. A system, comprising:
    a sensor platform of a vehicle; and
    a controller comprising:
    a processor; and
    a memory for storing instructions, the processor executing instructions to:
    determine a presence and a position of a driver in a sensing zone of a vehicle using output of the sensor platform integrated into the vehicle, wherein the presence and the position of the driver are associated with off-road or non-seated operation of the vehicle;
    determine, responsive to determining the presence and the position of the driver using the output of the sensor platform, when the position of the driver indicates that the driver is operating the vehicle from an operating position other than a fully-seated position relative to a driver's seat of the vehicle; and
    selectively adjust a vehicle parameter of the vehicle based on the driver operating the vehicle from the operating position other than the fully-seated position,
    wherein the controller is configured to:
        determine a baseline seating profile of the driver in the driver's seat using the output of the sensor platform;
        compare a current position of the driver to the baseline seating profile of the driver in the driver's seat, wherein the current position of the driver is at least partially in or on the vehicle; and
        determine that the driver is operating the vehicle from the operating position other than the fully-seated position when the comparison indicates that the driver is any one or more of leaning, kneeling, lifted off of the driver's seat, and standing, and
    wherein the controller selectively adjusts the vehicle parameter by:
        adjusting a braking response of the vehicle;
        adjusting a throttle response of the vehicle; and
        slowing the vehicle when the vehicle is in descent.

15. The system according to claim 14, wherein the sensor platform comprises one or more macro capacitive sensors being integrated into any one or more of the driver's seat or a vehicle structural component, the one or more macro capacitive sensors being configured to detect changes in capacitive fields to determine the presence and the position of the driver in the sensing zone, and combinations thereof.

16. The system according to claim 14, wherein the controller is further configured to activate a presence and position feature of the vehicle based on the output from the sensor platform, the presence and position feature being activated based on any one or more of:

sensing when the driver enters the vehicle;

determining when the vehicle is in an off-road mode;

determining when a roof or a door of the vehicle has been removed; and determining when an actuator for a non-seated drive mode has been activated.

\* \* \* \* \*